(12) United States Patent
Sinphay

(10) Patent No.: US 10,667,359 B2
(45) Date of Patent: May 26, 2020

(54) LIGHTING SYSTEM CONTROL BASED ON LIGHTING PLAYLIST

(71) Applicant: Hubbell Incorporated, Shelton, CT (US)

(72) Inventor: Anthony Sinphay, Greenville, SC (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/107,097

(22) Filed: Aug. 21, 2018

(65) Prior Publication Data

US 2019/0082512 A1   Mar. 14, 2019

Related U.S. Application Data

(60) Provisional application No. 62/558,534, filed on Sep. 14, 2017.

(51) Int. Cl.

| | |
|---|---|
| *H05B 37/02* | (2006.01) |
| *H05B 33/08* | (2020.01) |
| *G06F 3/0482* | (2013.01) |
| *G06F 3/0484* | (2013.01) |
| *H05B 45/20* | (2020.01) |

(Continued)

(52) U.S. Cl.
CPC ........... *H05B 45/20* (2020.01); *G06F 3/0482* (2013.01); *G06F 3/04847* (2013.01); *H05B 45/10* (2020.01); *H05B 47/12* (2020.01); *H05B 47/155* (2020.01)

(58) Field of Classification Search
CPC .............. H05B 37/0272; H05B 37/029; H05B 37/0245; H05B 37/0227; H05B 33/0845; H05B 33/0869; H05B 33/0863; H05B 37/0254; H05B 33/0872; H05B 37/02; H05B 37/0218; H05B 33/0842; H05B 33/08; H05B 39/088; H05B 45/20; H05B 45/10; H05B 47/12; H05B 47/155; Y02B 20/48; Y02B 70/3283; H04W 4/80; H04W 4/70; H04W 4/00; H04W 4/02; Y02D 70/00; Y02D 70/142; Y02D 70/144; Y02D 70/162; Y02D 70/166; G06F 3/04847; G06F 3/0482
See application file for complete search history.

(56) References Cited

U.S. PATENT DOCUMENTS 6,803,728 B2    10/2004   Balasubramaniam et al.
8,896,232 B2 *  11/2014   Bora ................. H05B 33/0863
                                                              315/307

(Continued)

*Primary Examiner* — Vibol Tan
(74) *Attorney, Agent, or Firm* — Michael Best & Friedrich, LLP

(57) ABSTRACT

Lighting system control based on lighting playlist(s) is disclosed. In one example implementation, a method includes obtaining, by one or more computing devices, data indicative of a user request for a selected lighting playlist from a plurality of lighting playlists. The user request can be implemented via a user interaction a user interface. In response to the request, the method can include obtaining, by the one or more computing devices, data associated with the selected lighting playlist from one or more memory devices. The method can include communicating, by the one or more computing devices, the data associated with the selected lighting playlist for control of a lighting system in accordance with the lighting playlist.

15 Claims, 6 Drawing Sheets

(51) Int. Cl.
     *H05B 45/10*     (2020.01)
     *H05B 47/12*     (2020.01)
     *H05B 47/155*    (2020.01)

(56) References Cited

U.S. PATENT DOCUMENTS

| Patent/Pub. No. | Date | Inventor | Classification |
|---|---|---|---|
| 8,922,126 B2 * | 12/2014 | Bora | H05B 33/0863 315/154 |
| 8,938,468 B2 * | 1/2015 | Morgan | H05B 37/029 362/544 |
| 9,345,103 B1 * | 5/2016 | Letourneur | H05B 33/086 |
| 9,629,226 B2 * | 4/2017 | Aggarwal | H04W 4/70 |
| 9,967,960 B2 * | 5/2018 | Bora | H05B 33/0863 |
| 9,980,351 B2 * | 5/2018 | Aggarwal | H04W 4/70 |
| 10,057,966 B2 * | 8/2018 | Amrine | H05B 33/0845 |
| 2011/0035404 A1 * | 2/2011 | Morgan | H05B 37/029 707/769 |
| 2015/0042240 A1 * | 2/2015 | Aggarwal | H04W 4/70 315/292 |
| 2016/0056971 A1 * | 2/2016 | Kazanchian | H05B 37/0272 340/4.3 |
| 2017/0245354 A1 | 8/2017 | Yadav et al. | |
| 2018/0235039 A1 * | 8/2018 | Krajnc | H05B 37/0245 |

* cited by examiner

LIGHTING SYSTEM CONTROL BASED ON LIGHTING PLAYLIST

PRIORITY CLAIM

The present application claims the benefit of priority of U.S. Provisional Patent Application Ser. No. 62/558,534 titled "Lighting System Control Based on Lighting Playlist," filed on Sep. 14, 2017, which is incorporated herein by reference.

FIELD

The present disclosure relates generally to lighting systems.

BACKGROUND

Lighting systems can include one or more light sources to provide illumination of a space. A variety of different lighting effects can be provided by the lighting system. For instance, the lighting system can be configured to emit light associated with differing colors, color temperature, intensity, lighting direction, or other characteristics.

Light emitting diode (LED) lighting systems can include one or more LED light sources that become illuminated as a result of the movement of electrons through a semiconductor material. LED lighting systems can provide greater flexibility in providing illumination with a desired spectral power distribution relative to other light sources, such as incandescent, fluorescent, and other legacy light sources. Certain LED lighting systems can include multiple LED devices associated with different color temperatures, color bands, intensities, monochromatic light and/or other characteristics. The light emitted by the different LED devices can be controlled to provide a desired collective light output at a desired color temperature and/or intensity for the lighting system.

SUMMARY

Aspects and advantages of embodiments of the present disclosure will be set forth in part in the following description, or may be learned from the description, or may be learned through practice of the embodiments.

One example aspect of the present disclosure is directed to a method of controlling a light output of a lighting system. The method includes obtaining, by one or more computing devices, data indicative of a user request for a selected lighting playlist from a plurality of lighting playlists. The user request can be implemented via a user interaction with a user interface. In response to the request, the method can include obtaining, by the one or more computing devices, data associated with the selected lighting playlist from one or more memory devices. The method can include communicating, by the one or more computing devices, the data associated with the selected lighting playlist for control of a lighting system in accordance with the lighting playlist.

Other example aspects of the present disclosure are directed to lighting systems, light engines, lighting circuits, lighting fixtures, devices, methods, and apparatus for controlling a lighting system according to example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
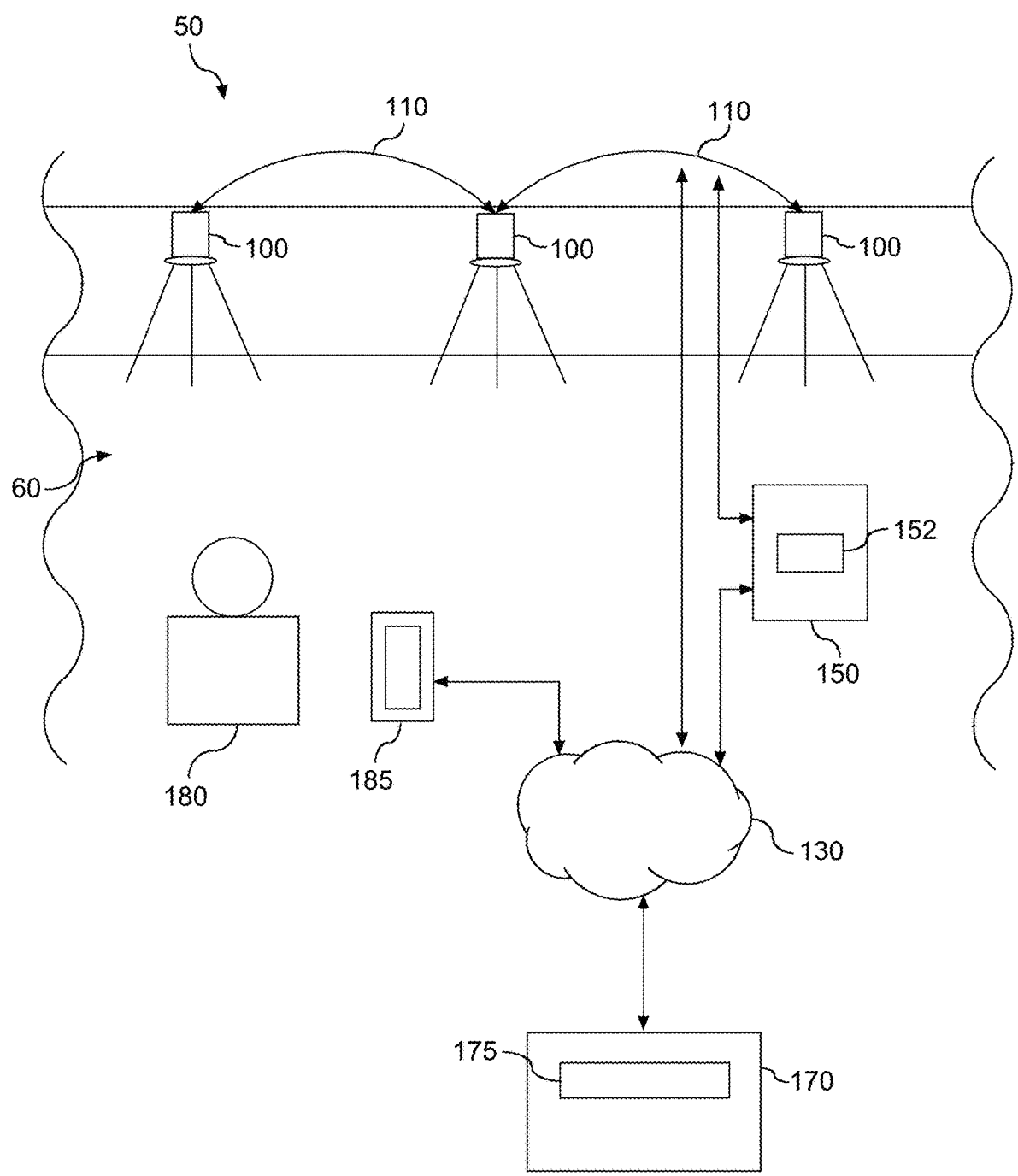
FIG. 1 depicts an overview of example lighting system according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling the output of light from lighting systems based on a lighting playlist. A lighting playlist can include data indicative of one or more light parameters for controlling aspects of a lighting system to provide desired lighting effects. A lighting playlist can specify light parameters such as color, color temperature, brightness, lighting duration, lighting effects (e.g., a strobe effect, a spotlight effect etc.), lighting direction, attributes related to an effect, etc., for lighting a space. In some examples, the lighting playlist can specify an adjustment to light parameters over time. However, in other examples, the lighting playlist can specify static light parameters that remain relatively constant over a time period.

According to example aspects of the present disclosure, data associated with a library of lighting playlists can be maintained, for instance, on a server (e.g., a web server) or other computing device (e.g., on a local memory storage associated with a lighting control system). A user can access the library of lighting playlists via a user interface. The user interface can be, for instance, a graphical user interface presented on a display screen. In addition and/or in the alternative, the user interface can be an audio interface configured to receive audio commands or other suitable interface configured to receive input from a user. The user can interact with the user interface to select a lighting playlist from the library of lighting playlists.

In response to selection of a particular lighting playlist, a lighting system can be controlled in accordance with light parameters specified by the lighting playlist. For instance, one or more lighting fixtures in a lighting system can be controlled to provide a light output in accordance with light parameters specified by the lighting playlist.

In some embodiments, the lighting playlist can be associated with various entities that may be of interest to a user. For example, a lighting playlist can be associated with a person (e.g. a celebrity). In this example, the lighting playlist can be based on particular lighting parameters used by the person in various scenarios (e.g., lighting the person's home, lighting for a concert, lighting for an artistic piece, etc.). As another example, the lighting playlist can be associated with a point of interest, such as a sports arena, a museum, a monument, etc. As another example, the lighting playlist can be associated with a sports team (e.g., making use of team colors, team themes, etc.). As another example, the lighting playlist can be associated with an event, such as a concert, show, movie, simulated event, etc.

In some embodiments, the lighting playlist can be periodically updated. For instance, a host associated with the lighting playlist can add new playlists to the library for selection as new lighting playlists become available. In addition, existing playlists can be revised as preferences change.

The preceding examples of lighting playlists are provided for purposes of illustration and discussion. Those of ordinary skill in the art, using the disclosures provided herein, will understand that other suitable lighting playlists can be used without deviating from the scope of the present disclosure.

In one example, a user can be browse through a list of available playlists for the user, for instance, in a graphical user interface. The graphical user interface can be presented on a display device, such as a display device associated with a lighting control system for a lighting system and/or on a user device (e.g., smartphone, laptop, wearable device, etc.). In some embodiments, the user device can be a mobile device that is capable of being carried by a user's hand while in operation. A user can select one or more playlists from the available list via a user interaction with the graphical user interface (e.g., a touch interaction, a click interaction, etc.).

In some embodiments, one or more lighting playlists can be suggested to a user based on user preferences. The user preferences can be specified by a user (e.g., as part of settings). In addition and/or in the alternative, historical data associated with user selection of lighting playlists can be analyzed to determined preferred characteristics for lighting playlists. These preferred characteristics can be used to suggest new lighting playlists to the user.

In response to the user selecting the one or more playlists, data associated with the playlist can be communicated (e.g., over any suitable wired and/or wireless communication medium) to a control system for the lighting system. The control system can process the data and execute one or more control actions to implement control of light output by the computing system. For instance, the control system can send signals to one or more lighting fixtures to adjust the color temperature, intensity, brightness, lighting direction, etc. of one or more lighting fixtures in the lighting system to provide a desired light output as specified by light parameters associated with the lighting playlist. In this way, a user can easily and efficiently control a lighting system to light a space in a manner similar to events and/or entities that may be of interest to the user.

As another example, a user can provide an audio command using speech to a user interface configured obtain audio input from a user. For instance, a user can provide an audio input in the form of speech "light room according to playlist A." The audio user interface can include a microphone. The audio input can include and/or can be in communication with (e.g., over a network) one or more processors configured to execute logic for speech recognition. The speech from the user can be processed to identify a selected playlist.

In response to the user selecting the one or more playlists, data associated with the playlist can be communicated (e.g., over any suitable communication medium) to a control system for the lighting system. The control system can process the data and execute one or more control actions to implement control of light output by the computing system. For instance, the control system can send signals to one or more lighting fixtures to adjust the color temperature, intensity, brightness, lighting direction, etc. of one or more lighting fixtures in the lighting system to provide a desired light output as specified by light parameters associated with the lighting playlist. In this way, a user can easily and efficiently control a lighting system to light a space in a manner similar to events and/or entities that may be of interest to the user.

Aspects of the present disclosure can provide a number of technical effects and benefits. For instance, a lighting system can be more efficiently controlled in accordance with a lighting playlist to provide desired lighting effects that may be of interest to a user. This can allow a user to enjoy various setting of a lighting system without requiring the user to manually select and/or program each setting.

Aspects of the present disclosure can also provide an improvement to computing technology used to implement lighting control. For instance, a user can specify control of a lighting system through simple interaction with a user interface (e.g., a graphical user interface and/or an audio user interface). This can avoid the need for computing resources and network resources to obtain multiple user interactions and/or inputs to adjust settings for the lighting system to achieve a desired light output. Memory and processing resources used for obtaining user inputs can be reserved for more core functions of the lighting system.

As used herein, a "lighting system" can include, but is not limited to, one or more of a lighting circuit, light engine, one or more lighting fixtures (i.e., luminaires), a plurality of lighting devices arranged in a space, a combination of any of the foregoing, or other system used to provide illumination. A "lighting fixture" or "luminaire" refers to a device used to provide light or illumination using one or more light sources. A "lighting playlist" refers to a set of light parameters and/or instructions for controlling a light output of a lighting system. The term "about" or "approximately" when used in conjunction with a numerical value refers to within 25% of the stated numerical value.

With reference now to the Figures, example embodiments of the present disclosure will now be set forth. FIG. 1 depicts an example lighting system 50 according to example embodiments of the present disclosure. As shown, the lighting system 50 includes a plurality of lighting fixtures 100 arranged in a space 60. Each of the plurality of lighting fixtures 100 can be any suitable lighting fixture configured to provide illumination for the space 60. Each of the lighting fixtures 100 can have a light source, such as an LED light source. Other light sources (e.g., incandescent, fluorescent, etc.) can be used without deviating from the scope of the present disclosure.

As will be discussed in more detail below, each of the plurality of lighting fixtures 100 can include or can communicate with one or more control device(s) configured to control the light output of the lighting fixtures according to a lighting playlist. The lighting playlist can specify light parameters of the light output (e.g., color temperature, color, intensity, direction, effects) for the space 60.

Each of the lighting fixtures 100 can include a communication interface that allows the fixture to communicate with other lighting fixtures 100 and/or other devices (e.g., a lighting control system, user devices, etc.). The lighting fixtures 100 can communicate directly with other lighting fixtures and devices (e.g., using peer-to-peer communication) and/or can communicate with other lighting fixtures and devices over a network, such as network 130.

The network 130 can include any suitable type of network such as a local area network (e.g., intranet), wide area network (e.g., Internet), low power wireless network (e.g., Bluetooth Low Energy (BLE), Zigbee, etc.), cellular network, or some combination thereof and can include any number of wired or wireless links. In general, communication over the network 130 can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), etc. Other suitable wired and/or wireless communication technologies can be used without deviating from the scope of the present disclosure.

In some embodiments, the lighting fixtures 100 can communicate with one another and can establish a communication network 110 among the lighting fixtures 100. The communication network 110 can have any suitable network configuration, such as a star configuration, a mesh configuration, or other configuration. In addition and/or in the alternative, the lighting fixtures 100 can communicate with each other and/or other devices over an independent network, such as network 130.

In some embodiments, the lighting fixtures 100 can communicate with each other so as to operate synchronously. When operating synchronously, each lighting fixture can provide a light output with similar characteristics (e.g., similar intensity and color temperature). In other implementations, the lighting fixtures can be operated differently (e.g., with different intensity and color temperatures) to provide desired lighting effects for the space.

In some embodiments, the lighting fixtures 100 can be in communication (e.g., either directly or over a network 130) with a lighting control system 150. The lighting control system 150 can be configured to control aspects of the lighting fixtures 100 and/or other lighting fixtures (not illustrated) that form a part of the lighting system to provide a desired light output for the space. For instance, the lighting control system 150 can provide for dimming, color tuning, implementation of lighting effects, etc. The lighting control system 150 can include an interface (e.g., visual and/or audio interface) to receive input from user to program or manually adjust parameters of light output by the lighting system 50.

In example embodiments, the lighting control system 150 can include one or more processors and one or more memory devices. The one or more memory devices can store computer-readable instructions that when executed by the one or more processors cause the lighting control system 150 to implement control functionality for the lighting system 150 as described herein. For instance, the lighting control system 150 can send control signals to each lighting fixture 100 to control the light output of the lighting fixture 100.

In some embodiments, the control system 150 can include and/or be in communication with a display device 152. The display device 152 can provide an interface for a user to interact with the lighting control system 150 to adjust settings of the lighting system 50. For instance, a graphical user interface can be presented on the display device 152. A user can interact with the graphical user interface to dim, color tune, adjust settings, or otherwise configure the lighting system 50. As will be discussed in detail below, in some embodiments, a user can interact with a graphical user interface presented on the display device 152 to select a lighting playlist for control of the lighting system.

In some embodiments, the control system 150 can include and/or be in communication with an audio interface (e.g., microphone or audio interface device). A user can interact with the audio interface to dim, color tune, adjust settings, or otherwise configure the lighting system 50. As will be discussed in detail below, in some embodiments, a user can interact with the audio interface to select a lighting playlist for control of the lighting system.

The lighting control system 150 and/or the one or more of the lighting fixtures 100 can be in communication with a user device 185, such as a smartphone, tablet, PDA, wearable device, laptop, desktop, display with one or more processors or other user device, mobile device. In some embodiments, the user device can be mobile device capable of being carried by a user in the space 60 while in operation. The user device 185 can provide an interface for user 180 to interact with the lighting system 50. For instance, the user device 185 can implement an application that provides a graphical user interface on a display of the user device 185 to allow the user 180 to configure the light system 50. In addition and/or in the alternative, the user can interact with an audio interface implemented using the user device 185 (e.g., one or more microphones on the user device 185) to allow the user 180 to configured the light system 50.

According to example embodiments of the present disclosure, the lighting system 50 can be in communication with a computing device 170 over network 130. The computing device 170 can be, for instance a server (e.g., a web server accessible over the Internet). The computing device 170 can include one or more processors and one or more memory devices. The computing device 170 can store a library 175 of lighting playlists, for instance, in the one or more memory devices. As discussed above, each lighting playlist in the library of playlists can specify light parameters for the light output of the lighting system.

Aspects of the present disclosure are discussed with reference to the lighting playlist being stored on a computing device 170, such as a server. However, the lighting playlist can be stored on any device (e.g. in one or more memory devices) accessible by the lighting system 50, such as on user device 185 and/or on local memory associated with the lighting control system 150.

In particular embodiments, a user 180 can select a lighting playlist for controlling the lighting system 50 by interacting with a graphical user interface. For instance, the user can interact with a graphical user interface presented on a display device associated with user device 185. In addition and/or in the alternative, the user can interact with a graphical user interface presented on a display device 152 associated with the lighting control system 150.

Figure 2:
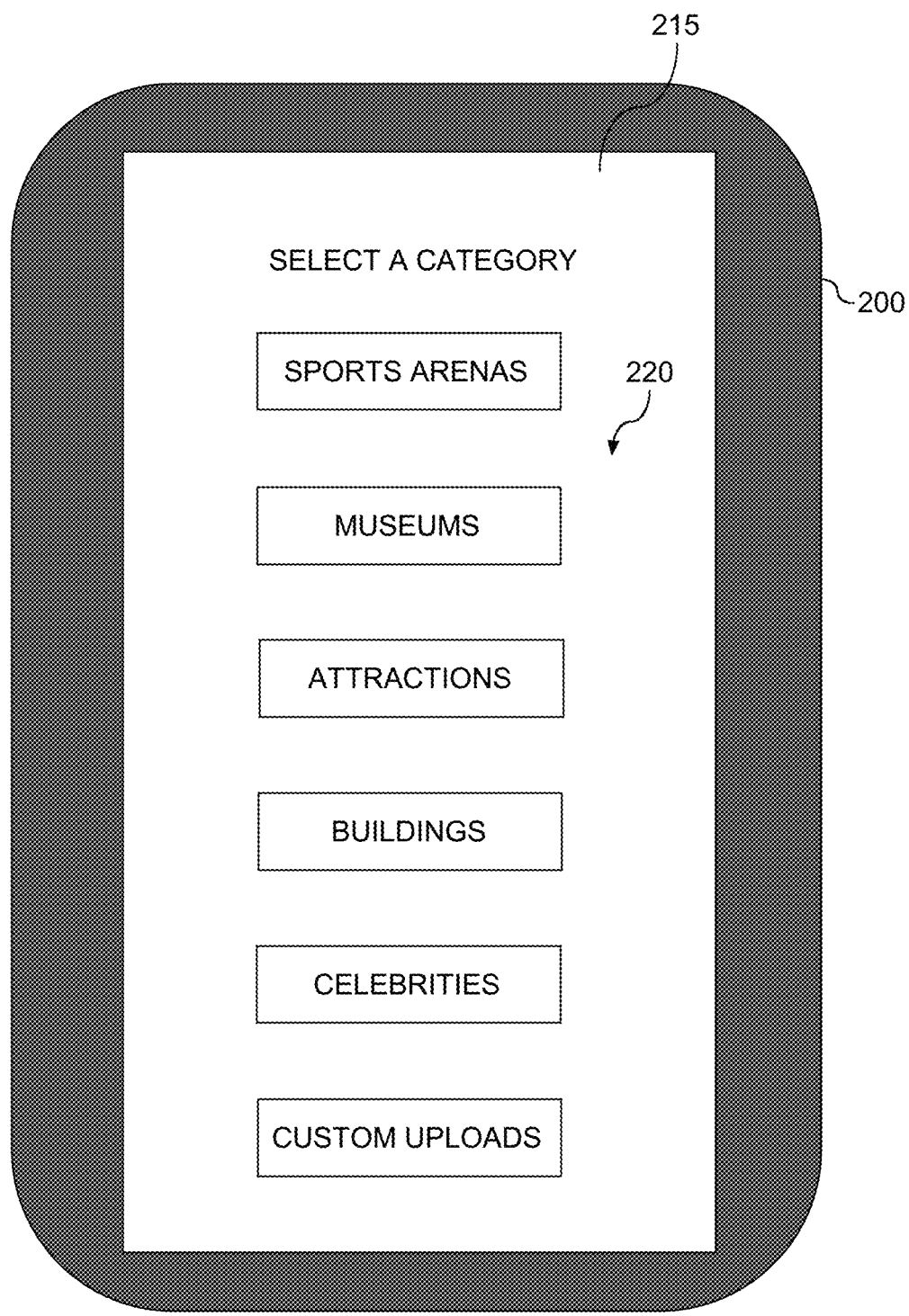
FIG. 2 depicts an example graphical user interface according to example embodiments of the present disclosure.

FIG. 2 depicts a portion of an example graphical user interface 215 presented on a display device 200 for selecting a lighting playlist according to example embodiments of the present disclosure. As shown in the graphical user interface 215, the playlists can be categorized (e.g., grouped, ordered, prioritized, etc.). The graphical user interface 215 can present a list of categorizes and can also present a list of playlists associated a selected category. As shown, the categories can include many themes, such as sports arenas, museums, attractions, buildings, celebrities, custom uploads, etc. Custom uploads can be custom lighting playlists generated by a user or other person. Although specific examples of categories of playlists are given, those of ordinary skill in the art, using the disclosures provided herein, will realize that the specific examples are given for illustration purposes only and that any category of lighting playlist can be used without deviating from the scope of the present disclosure. A user can select a particular category by interacting (e.g., via a touch interaction or click interaction) with an interface element 220 associated with the category.

Figure 3:
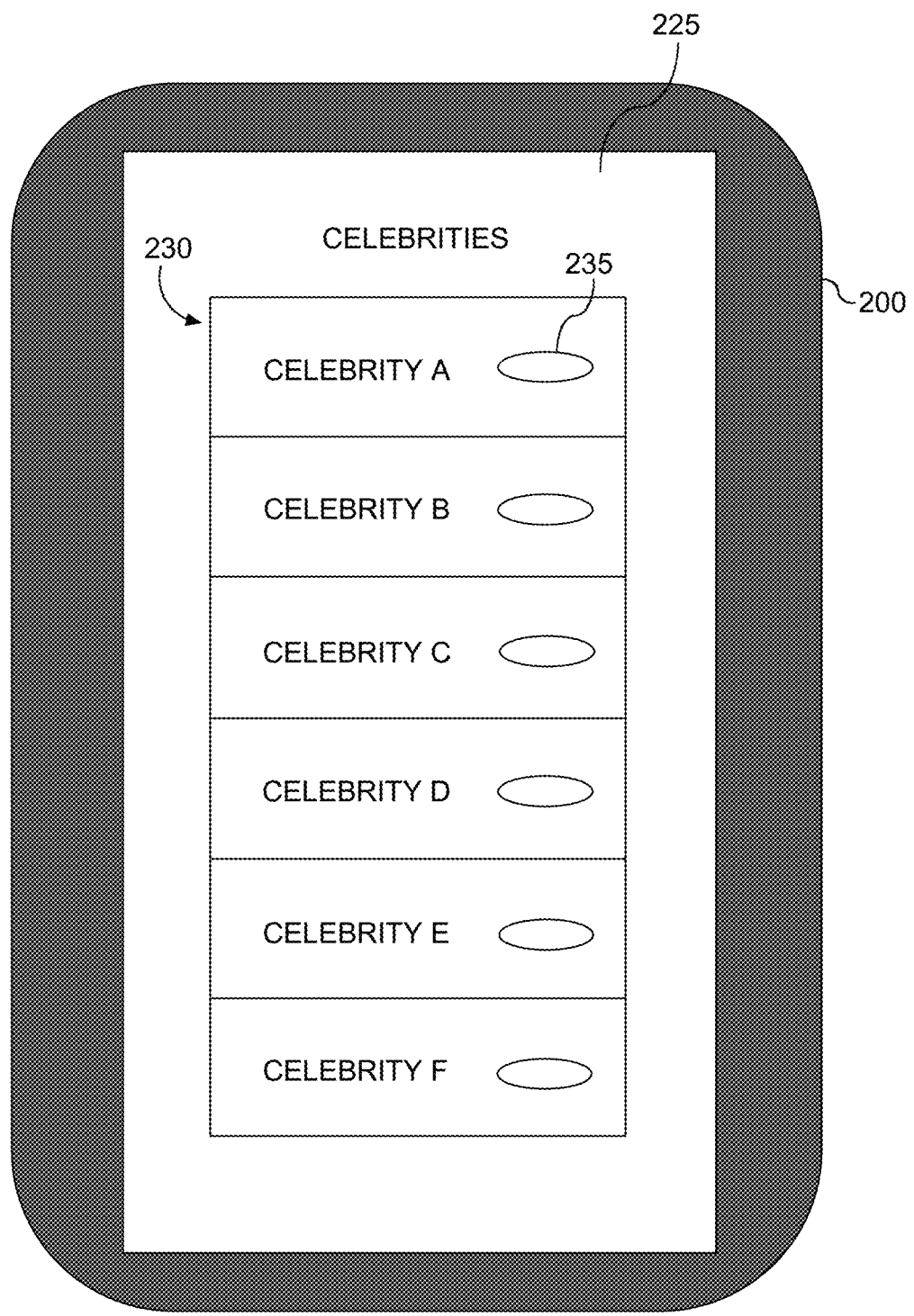
FIG. 3 depicts an example graphical user interface according to example embodiments of the present disclosure.

FIG. 3 depicts a portion of a graphical user interface 225 that can be presented on a display device 200 after selection of a particular category of lighting playlists. The interface 225 can present interface elements 230 associated with one or more of a plurality of lighting playlists within the selected category. Additional lighting playlists can be observed by scrolling the interface (e.g., scrolling up or down, scrolling left or right, etc.) A user can select a particular lighting playlist by interacting with an interface element, such as interface element 235.

FIGS. 2 and 3 depict aspects of one example graphical user interface that can be used to select a lighting playlist from a library of lighting playlists according to particular embodiments of the present disclosure. Those of ordinary skill in the art, using the disclosures provided herein, will understand that the graphical user interface can take any of a variety of forms without deviating from the scope of the present disclosure.

Turning back to FIG. 1, when a playlist is selected, the selected playlist and/or light parameters associated with the selected playlist can be retrieved from the computing device 170 and transmitted across the network 130 to the lighting fixtures 100, user device 185, and/or control system 150. The lighting fixtures 100 can then be controlled to provide light output in accordance with light parameters specified by the selected lighting playlist.

Figure 4:
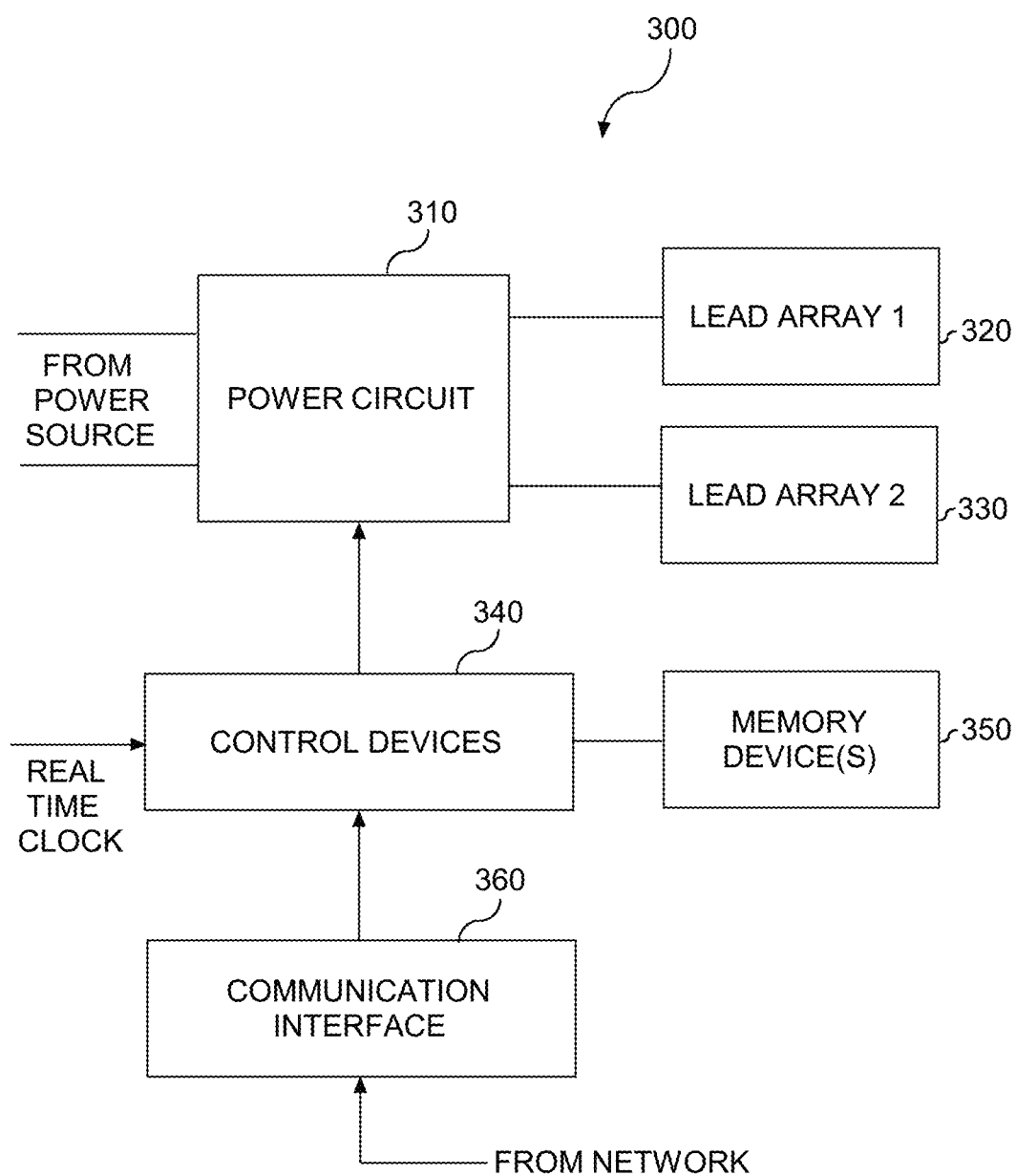
FIG. 4 depicts a block diagram associated with a lighting fixture according to example embodiments of the present disclosure.

FIG. 4 depicts a schematic of an example block diagram 300 for a lighting fixture 100 according to example embodiments of the present disclosure. As shown, the lighting fixture 100 can include a power circuit 310, a first LED array 320 and a second LED array 330. Each LED array can include one or more light emitting diode (LED) devices or other solid state light sources.

While two LED arrays are illustrated in FIG. 1, those of ordinary skill in the art, using the disclosure provided herein will understand that any number of LED arrays can be used in the lighting fixture 100 without deviating from the scope of the present disclosure. In addition, the present disclosure is discussed with reference to LED light sources for purposes of illustration and discussion. Other suitable light sources can be used without deviating from the scope of the present disclosure.

Each of the first LED array 320 and the second LED array 330 can include one or more LED devices. The LED devices can emit light (e.g. visible light, ultraviolet light, infrared light, or other light or electromagnetic energy) as a result of electrons moving through a semiconductor material. In particular example implementations, the first LED array 320 can be associated with a different color temperature relative to the second LED array 330. The present disclosure is discussed with reference to LED arrays having different color temperature for purposes of illustration and discussion. The LED arrays can include many other suitable variations without deviating from the scope of the present disclosure. For instance, the LED arrays can be associated with a different brightness, different color, different lighting direction, different layout, or other suitable characteristics. The LED arrays 320 and 330 can be implemented on the same circuit board or on different circuit boards.

The power circuit 310 can be configured to receive an input power from a power source (e.g., an AC or DC power source, power over Ethernet, etc.) and convert the input power to an output power suitable for powering one or more light sources, such as first LED array 320 and second LED array 330. In some embodiments, the power circuit 310 can be configured to provide different driving currents to the first LED array 320 and the second LED array 330. For instance, the power circuit 310 can include one or more of a multi-channel driver circuit, a current splitter circuit, one or more current regulators, and/or other devices that can be used to independently provide a driver current to the first LED array 320 and the second LED array 330.

The lighting fixture 100 can include means for controlling a power distribution among the first LED array and the second LED array so that a collective output of the first LED array and the second LED array can be adjusted according to one or more light parameters associated with a selected lighting playlist.

For instance, the lighting fixture 100 can include one or more control device(s) 340. The control device(s) 340 can include, for instance, one or more microcontrollers, microprocessors, logic circuits, ASICs, etc. The control device(s) 340 can send control signals to the power circuit 310 to control the intensity, color temperature, and/or other parameters of the collective light output by the first LED array 320 and the second LED array 330. More particularly, the control device(s) 340 can send control signals to the power circuit 310 to control the power distribution (e.g. driving current) among the plurality of LED arrays 320 and 330 to provide a desired light output by the fixture 100.

The lighting fixture 100 can include one or more memory devices 350. The memory device(s) 350 can be, for instance, one or more computer-readable media, including, but not limited to, non-transitory computer-readable media, RAM, ROM, flash memory or other memory devices. The memory device(s) 350 can store computer-readable instructions that when executed by the control device(s) 340 cause the control devices(s) 340 to perform operations. For instance, the memory device(s) 350 can store computer-readable instructions that when executed by the one or more control device(s) 340 cause the one or more control device(s) 340 to control the power circuit 310 based on a lighting playlist according to example embodiments of the present disclosure. The memory device(s) 350 are illustrated as being separate from the control device(s) 340. However, those of ordinary skill in the art, using the disclosures provided herein, will understand that the memory device(s) 350 can be included as part of the control device(s) 340 without deviating from the scope of the present disclosure.

The lighting fixture 100 can further include a communication interface 360. The communication interface 360 can include one or more devices used to communicate information from remote devices, such as other lighting fixtures, user devices, sensors, and other devices. The communication interface 360 can include, for instance, communication circuits, chips, antennas, ports, transmission lines, pins, and other components for communicating information to or from the lighting fixture 100. The communication interface 360 can be configured to communicate information with one or more remote devices or with one or more networks using wired and/or wireless communication links. In some embodiments, light parameters or other data associated with a lighting playlist can be communicated to the lighting fixture 100 via the communication interface 360.

According to particular aspect of the present disclosure, the control device(s) 340 can access a signal indicative of a clock. The signal indicative of a clock can be accessed from a circuit external to the control device(s) 340 and/or can be generated internally by the control device(s) 340. In addition and/or in the alternative, the control device(s) 340 can receive a signal indicative of a clock from one or more remote devices via the communication interface 360.

The control device(s) 340 can be configured to control the power circuit 310 to provide a power distribution among the plurality of LED arrays 320 and 330 based at least in part on the signal indicative of the clock 345. For instance, the control device(s) 340 can access a lighting playlist stored in the memory device(s) 350 and/or accessed from a remote device via the communications interface 360. As discussed above, the lighting playlist can specify a varying color temperature and/or intensity of the collective light output provided by the LED arrays 320 and 330 for various different times indicated by the signal indicative of the clock 345.

The control device(s) 340 can determine the light output specified by the lighting playlist at the time indicated by the signal indicative of the clock. The control device(s) 340 can then determine a control signal for controlling the power circuit to provide a power distribution among the plurality of LED arrays 320 and 330 to achieve the specified light output. Instructions associated with the required power distribution to achieve various light outputs can also be stored in the memory device(s) 350 or accessed by the control device(s) 340 from a remote device via the communication interface 360. The control signal can be provided to the power circuit 310. The power circuit 310 can then allocate power among the plurality of LED arrays 320 and 330 so that the lighting fixture 100 provides a collective light output as specified by the lighting playlist.

In some embodiments, the power circuit 310 can be a multichannel driver. In some embodiments, the power circuit 310 can include a single channel driver and a current splitter circuit configured to split the output of the single channel driver among the plurality of LED arrays 320 and 330. The control signal can control the current splitter circuit to control the ratio of current provided to the LED array 320 relative to the LED array 330.

Figure 5:
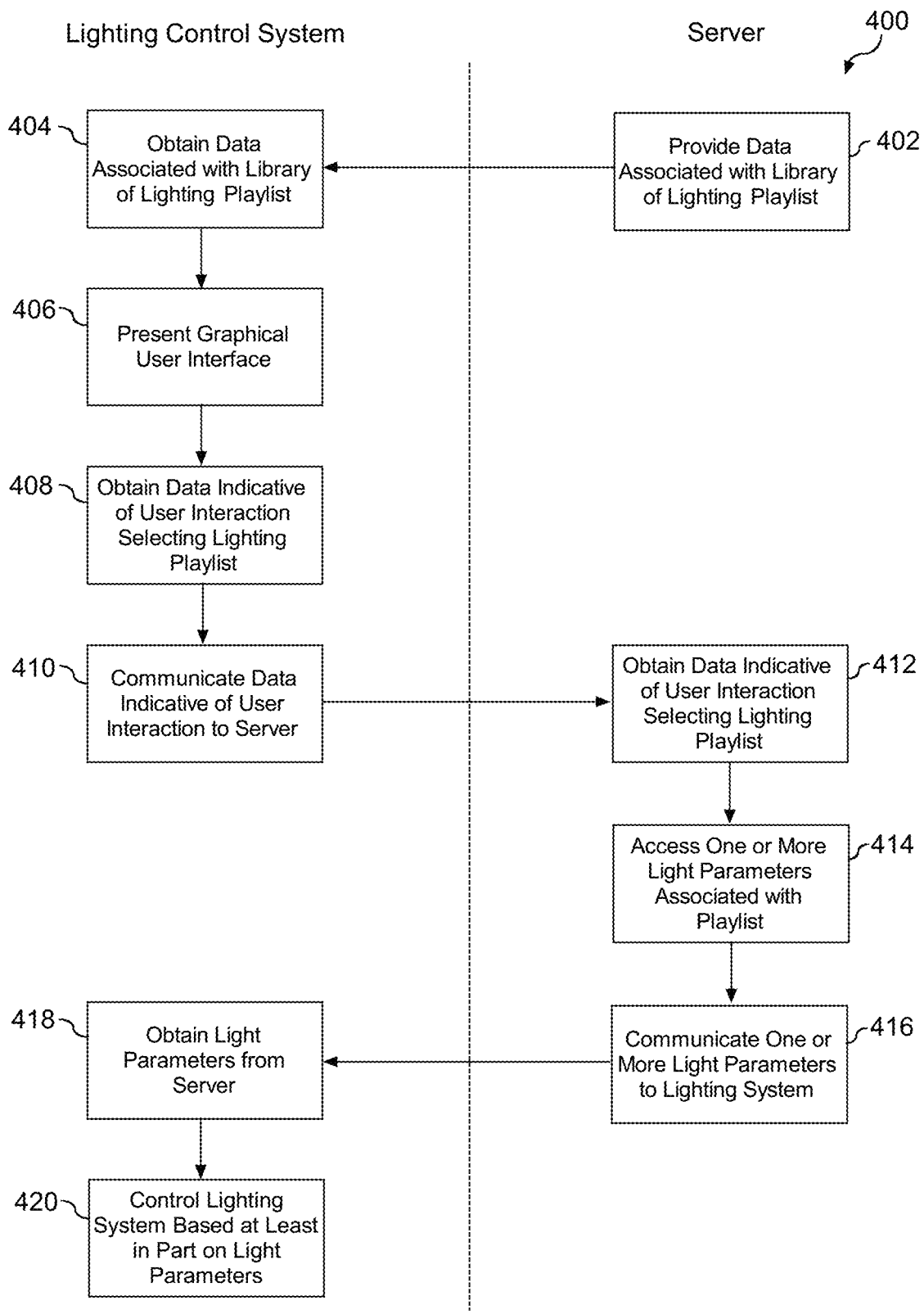
FIG. 5 depicts a flow diagram of an example method according to example embodiments of the present disclosure.

FIG. 5 depicts an example client server flow diagram for an example method (400) according to example embodiments of the present disclosure. The method (400) can be implemented using a client server architecture where the client device is a lighting control system (e.g., lighting control system 150 of FIG. 1). The server can be a server (e.g., computing device 170 of FIG. 1) hosting a library of lighting playlists. The method (400) can be implemented using other suitable architectures, such as a single computing device. In addition, FIG. 5 depicts steps performed in a particular order for purposes of illustration and discussion. Those of ordinary skill in the art, using the disclosures provided herein, will understand that various steps of any of the methods provided herein can be adapted, modified, rearranged, omitted, performed simultaneously, and/or expanded in various ways without deviating from the scope of the present disclosure.

At (402), the server can provide data associated with a library of lighting playlists. For instance, a server can provide for display to the lighting control system data associated with a graphical user interface for selecting a lighting playlist from a plurality of lighting playlists. Information associated with one or more of the lighting playlists can also be served to the lighting control system. For instance, metadata, identifiers, and/or other data (e.g., preview data) associated with one or more of the lighting playlists can be provided to the lighting control system.

At (404), the lighting control system can obtain the data associated with the library of lighting playlists from the server. The lighting control system can then present the graphical user interface for selecting a lighting playlist from a plurality of lighting playlists on a display device (e.g., a touch panel, display screen, or other device associated with the lighting control system) as shown at (406).

At (408), the lighting control system can obtain data indicative of a user interaction with the graphical user interface selecting a lighting playlist. For instance, the lighting control system can obtain data associated with a touch interaction, click interaction, or other interaction indicative of a user selection of a lighting playlist via the graphical user interface. Data indicative of the user interaction selecting a lighting playlist can be communicated from the lighting control system to the server at (410).

At (412), the server can obtain the data indicative of the user interaction selecting the lighting playlist from the lighting control system. The server can then access one or more light parameters associated with the lighting playlist (414). The one or light parameters can specify, for instance, color, color temperature, brightness, lighting duration, effects (e.g., a strobe effect, a spotlight effect etc.), lighting direction, attributes related to an effect, etc., for lighting a space. In some examples, the lighting playlist can specify an adjustment to light parameters over time. However, in other examples, the lighting playlist can specify static light parameters that remain relatively constant over a time period.

In some embodiments, the light parameters can be obtained from a lookup table or other function correlating light parameters with a selected lighting playlist. Other suitable methods for obtaining light parameters associated with a lighting playlist can be used without deviating from the scope of the present disclosure. For instance, a lighting playlist can point to a specific address in a memory device. The address in the memory device can store light parameters associated with the lighting playlist. As another example, data packets associated with the lighting playlist selected for communicating over a communication medium can include the light parameters.

At (416), the method can include communicating the one or more light parameters from the server to the lighting control system. At (418), the lighting control system obtains the one or more light parameters from the server. The lighting control system can then control the lighting system based at least in part on the light parameter(s) (420). For instance, the lighting control system can provide control signals to individual lighting fixtures in the lighting system to provide light output in accordance with the light parameters.

Figure 6:
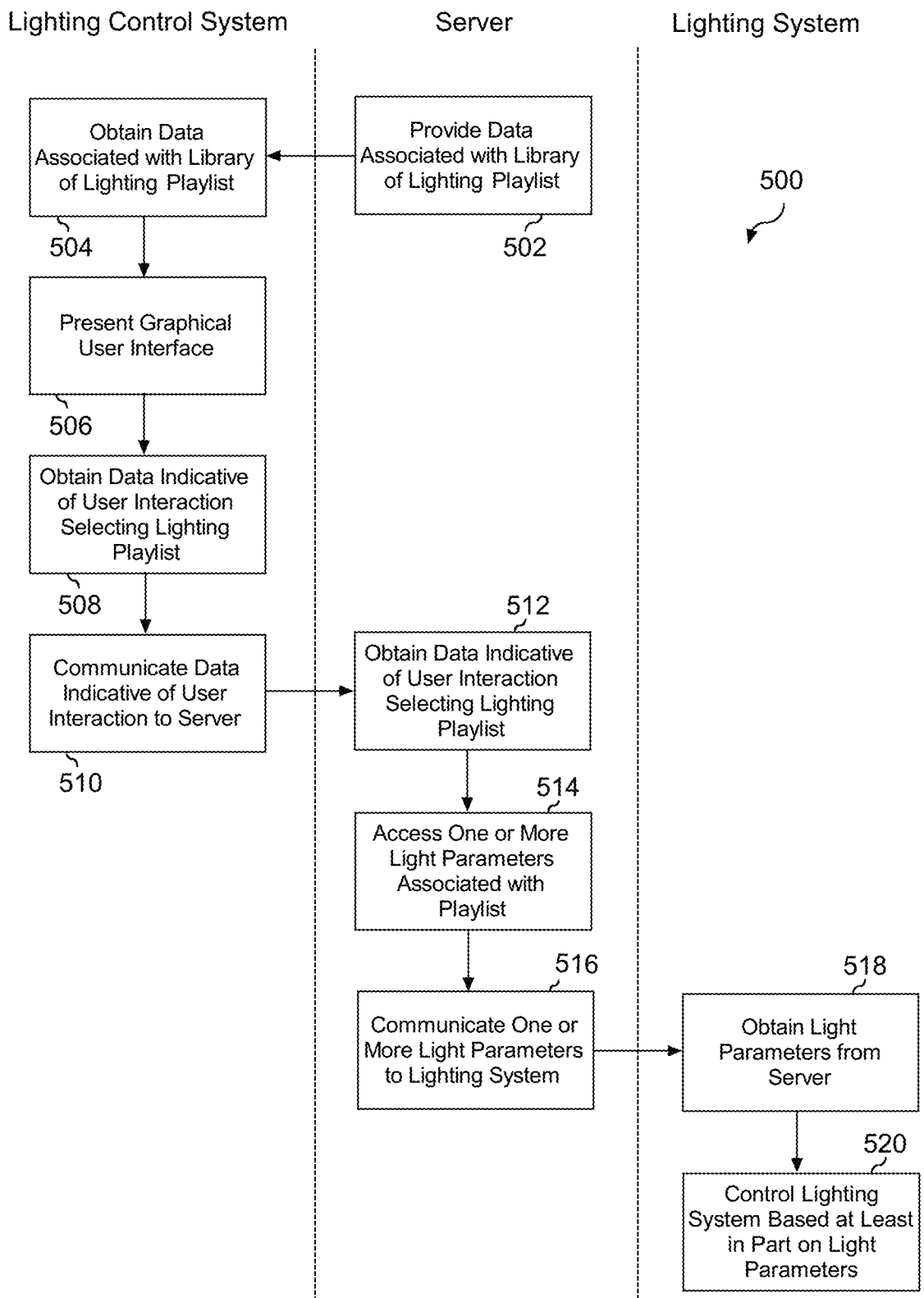
FIG. 6 depicts a flow diagram of an example method according to example embodiments of the present disclosure.

FIG. 6 depicts an example client server flow diagram for an example method (500) according to example embodiments of the present disclosure that includes interaction with a graphical user interface presented on a user device, such as a laptop, tablet, smartphone, wearable device, or other user device. The method (500) can be implemented using a client server architecture where the client devices include a user device (e.g., user device 185 of FIG. 1) and a lighting control system (e.g., lighting control system 150 of FIG. 1). The server can be a server (e.g., computing device 170 of FIG. 1) hosting a library of lighting playlists. The method (500) can be implemented using other suitable architectures, such as a single computing device. In addition, FIG. 6 depicts steps performed in a particular order for purposes of illustration and discussion. Those of ordinary skill in the art, using the disclosures provided herein, will understand that various steps of any of the methods provided herein can be adapted, modified, rearranged, omitted, performed simultaneously, and/or expanded in various ways without deviating from the scope of the present disclosure.

At (502), the server can provide data associated with a library of lighting playlists. For instance, a server can provide for display to the user device data associated with a graphical user interface for selecting a lighting playlist from a plurality of lighting playlists. Information associated with one or more of the lighting playlists can also be served to the user device. For instance, metadata, identifiers, and/or other data (e.g., preview data) associated with one or more of the lighting playlists can be provided to the user device.

At (504), the user device can obtain the data associated with the library of lighting playlists from the server. The user device can then present the graphical user interface for selecting a lighting playlist from a plurality of lighting playlists on a display device (e.g., a touch screen associated with the user device) as shown at (506).

At (508), the lighting control system can obtain data indicative of a user interaction with the graphical user interface selecting a lighting playlist. For instance, the lighting control system can obtain data associated with a touch interaction, click interaction, or other interaction indicative of a user selection of a lighting playlist via the graphical user interface. Data indicative of the user interaction selecting a lighting playlist can be communicated from the user device to the server at (510).

At (512), the server can obtain the data indicative of the user interaction selecting the lighting playlist from the user device. The server can then access one or more light parameters associated with the lighting playlist (514). The one or light parameters can specify, for instance, color, color temperature, brightness, lighting duration, effects (e.g., a strobe effect, a spotlight effect etc.), lighting direction, attributes related to an effect, etc., for lighting a space. In some examples, the lighting playlist can specify an adjustment to light parameters over time. However, in other examples, the lighting playlist can specify static light parameters that remain relatively constant over a time period.

In some embodiments, the light parameters can be obtained from a lookup table or other function correlating light parameters with a selected lighting playlist. Other suitable methods for obtaining light parameters associated with a lighting playlist can be used without deviating from the scope of the present disclosure. For instance, a lighting playlist can point to a specific address in a memory device. The address in the memory device can store light parameters associated with the lighting playlist. As another example, data packets associated with the lighting playlist selected for communicating over a communication medium can include the light parameters.

At (516), the method can include communicating the one or more light parameters from the server to a lighting control system and/or to one or more lighting fixtures. At (518), the lighting control system and/or one or more lighting fixtures obtain the light parameter(s) from the server. The lighting control system and/or light fixtures can then control the light output of lighting system based at least in part on the light parameter(s) (520).

Other suitable exchanges of data and information for controlling a lighting system based on a lighting playlist are within the scope of the present disclosure. For example, a user device can store a plurality of lighting playlists in local memory and communicate directly or over a network with lighting fixtures to control light output in accordance with the lighting playlist. As another example, a lighting fixture can communicate directly with a server to access information associated with a selected lighting playlist.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of controlling a light output of a lighting system, the method comprising:

obtaining, by one or more computing devices, data associated with a library of lighting playlists for the lighting system, the library comprising a plurality of lighting playlists;

responsive to obtaining the data associated with the library of lighting playlists, displaying, by the one or more computing devices, a a first plurality of interface elements on a display device, each of the first plurality of interface elements corresponding to a different category of lighting playlists;

obtaining, by the one or more computing devices, data indicative of a user request for a selected category of lighting playlists, the user request implemented via a user interacting with one of the first plurality of interface elements;

responsive to obtaining the data indicative of the user request, displaying, by the one or more computing devices, a second plurality of interface elements on the display device, each of the second plurality of interface elements corresponding to a lighting playlist included in the library and associated with the selected category of lighting playlists;

obtaining, by the one or more computing devices, data indicative of a user request for a selected lighting playlist within the selected category of lighting playlists, the user request implement via a user interacting with one of the second plurality of interface elements;

responsive to obtaining the data indicative of the user request for the selected lighting playlist, obtaining, by the one or more computing devices, data associated with the selected lighting playlist from one or more memory devices; and communicating, by the one or more computing devices, the data associated with the selected lighting playlist for control of the light output of the lighting system in accordance with the selected lighting playlist.

2. The method of claim 1, wherein the selected lighting playlist specifies one or more light parameters of a light output of the lighting system.

3. The method of claim 2, wherein the data associated with the selected lighting playlist comprises the one or more light parameters.

4. The method of claim 2, wherein the one or more light parameters are associated with a color, color temperature, brightness, lighting duration, lighting effect, or lighting direction.

5. The method of claim 1, wherein the selected lighting playlist specifies an adjustment to a light parameter over time.

6. The method of claim 1, wherein the selected lighting playlist specifies a static light parameter that remains relatively constant over a time period.

7. The method of claim 1, wherein the selected lighting playlist is associated with a point of interest.

8. The method of claim 1, wherein the selected lighting playlist is associated with an event.

9. The method of claim 1, wherein the one or more computing devices are associated with a lighting control system for the lighting system.

10. The method of claim 1, wherein the one or more computing devices are associated with a server in communication with a lighting control system for the lighting system.

11. The method of claim 1, wherein the one or more computing devices are associated with a user device in communication with a lighting control system for the lighting system.

12. A lighting system, comprising:
one or more lighting fixtures;
one or more control devices, the one or more control devices configured to perform operations comprising:
obtaining data associated with a library of lighting playlists for the lighting system, the library comprising a plurality of lighting playlists;
responsive to obtaining the data associated with library of lighting playlists, displaying a first plurality of interface elements on a display device, each of the first plurality of interface elements corresponding to a different category of lighting playlists;
obtaining data indicative of a user request for a selected category of lighting playlists, the user request implemented via a user interacting with one of the first plurality of interface elements;
responsive to obtaining the data indicative of the user request for a selected category of lighting playlists, displaying a second plurality of interface elements on the display device, each of the second plurality of interface elements corresponding to a lighting playlist included in the library and associated with the selected category of lighting playlists;
obtaining data indicative of a user request for a selected lighting playlist within the selected category of lighting playlists, the user request implement via a user interacting with one of the second plurality of interface elements;
responsive to obtaining the data indicative of the user request for the selected lighting playlist, obtaining one or more light parameters of a light output of the lighting system based at least in part on the selected lighting playlist; and
controlling the light output of the lighting system based at least in part on the one or more light parameters.

13. The lighting system of claim 12, wherein the selected lighting playlist specifies one or more light parameters of a light output of the lighting system.

14. The lighting system of claim 13, wherein the one or more light parameters are associated with a color, color temperature, brightness, lighting duration, lighting effect, or lighting direction.

15. The lighting system of claim 12, wherein the selecting lighting playlist is associated with a point of interest.

* * * * *